United States Patent
Mekid

(10) Patent No.: US 8,866,648 B2
(45) Date of Patent: Oct. 21, 2014

(54) THROUGH METAL COMMUNICATION SYSTEM

(75) Inventor: Samir Mekid, Manchester (GB)

(73) Assignee: King Fahd University of Petroleum and Minerals, Dhahran (SA)

( * ) Notice: Subject to any disclaimer, the term of this patent is extended or adjusted under 35 U.S.C. 154(b) by 740 days.

(21) Appl. No.: 13/196,685

(22) Filed: Aug. 2, 2011

(65) Prior Publication Data
US 2013/0032415 A1   Feb. 7, 2013

(51) Int. Cl.
*H03M 7/40*   (2006.01)
*H04L 15/04*   (2006.01)
*H04L 17/02*   (2006.01)

(52) U.S. Cl.
CPC ............... *H04L 15/04* (2013.01); *H04L 17/02* (2013.01)
USPC .............................................. 341/66; 341/51

(58) Field of Classification Search
CPC ........ H04L 17/02; H04I 15/04; G06F 3/0488; G05D 1/0212; H04M 1/72594
USPC ............................................... 341/50, 51, 66
See application file for complete search history.

(56) References Cited

U.S. PATENT DOCUMENTS

| 4,197,524 A | 4/1980 | Salem |
| 8,000,729 B1 * | 8/2011 | Jones ........................... 455/466 |
| 2005/0072237 A1 | 4/2005 | Paige et al. |
| 2012/0050198 A1 * | 3/2012 | Cannon ......................... 345/173 |

FOREIGN PATENT DOCUMENTS

| GB | 646359 A | 11/1950 |
| WO | WO 9624751 A1 | 8/1996 |

OTHER PUBLICATIONS

Penguin Robot Morse Code Foot Tapper (3 pages) retrieved Jun. 29, 2011   http://forums.parallax.com/showthread.php?100028-PENGUIN-ROBOT-Morse-Code-Foot-Tapper-the-Code&s=51136acd17ceaf3e4b6062a43bcc376e.

* cited by examiner

*Primary Examiner* — Peguy Jean Pierre
(74) *Attorney, Agent, or Firm* — Richard C Litman

(57) ABSTRACT

The through metal communication system sends messages by tapping on metal barriers, such as pipelines, bulkheads, and the like. A robotic element attaches itself to a metal barrier, wall, pipe, and the like. A piezoelectric tapping device is attached to the robotic element and can tap an encoded message onto the metal. The robot preferably includes a piezoelectric actuator, a microcontroller to convert text/information to Morse code, and a power source for the actuator. The messages are retrieved and interpreted by a remote transducer connected to a computer or microcontroller.

14 Claims, 4 Drawing Sheets

THROUGH METAL COMMUNICATION SYSTEM

BACKGROUND OF THE INVENTION

1. Field of the Invention

The present invention relates to a through metal communication system that sends messages by tapping on metal barriers, such as pipelines, bulkheads, and the like. The messages are retrieved by a remote transducer.

2. Description of the Related Art

The tap code is a way to encode messages, letter by letter, in a very simple way and transmit it using a series of tap sounds, hence its name. It has been commonly used by prisoners to communicate with each other. The method of communicating is usually by "tapping" either the metal bars, pipes or the walls inside the cell.

The tap code is based on a 5×5 grid of letters, representing all the letters of the Latin alphabet except K (C is used to represent K). Each letter is communicated by tapping two numbers, the first designating the row (horizontal) and the second designating the column (vertical). The letter "X" is used to break up sentences. The tap code requires the listener to only discriminate the timing of the taps to isolate letters. For example, to specify the letter "A", one taps once, pause, and then taps once again.

Robotic exploration for maintenance, repair, etc., in a ship or on an oil rig requires some means of communication for the robot to describe its findings. The problem. is that in such environments it is not always easy to send an electromagnetic signal to convey the robot's findings. Radio frequency (wireless) is not a solution because of the material of the pipes (metal).

Thus, a through metal communication system solving the aforementioned problems is desired.

SUMMARY OF THE INVENTION

The through metal communication system is a through metal communication system that sends messages by tapping on metal barriers, such as pipelines, bulkheads, and the like. A robotic element attaches itself to a metal barrier, wall, pipe, and the like. A piezoelectric tapping device is attached to the robotic element and can tap an encoded message onto the metal. The robot preferably includes a piezoelectric actuator, a microcontroller to convert text/information to Morse code, and a power source for the actuator. The messages are retrieved and interpreted by a remote transducer connected to a computer.

These and other features of the present invention will become readily apparent upon further review of the following specification and drawings.

DETAILED DESCRIPTION OF THE PREFERRED EMBODIMENTS

Figure 1:
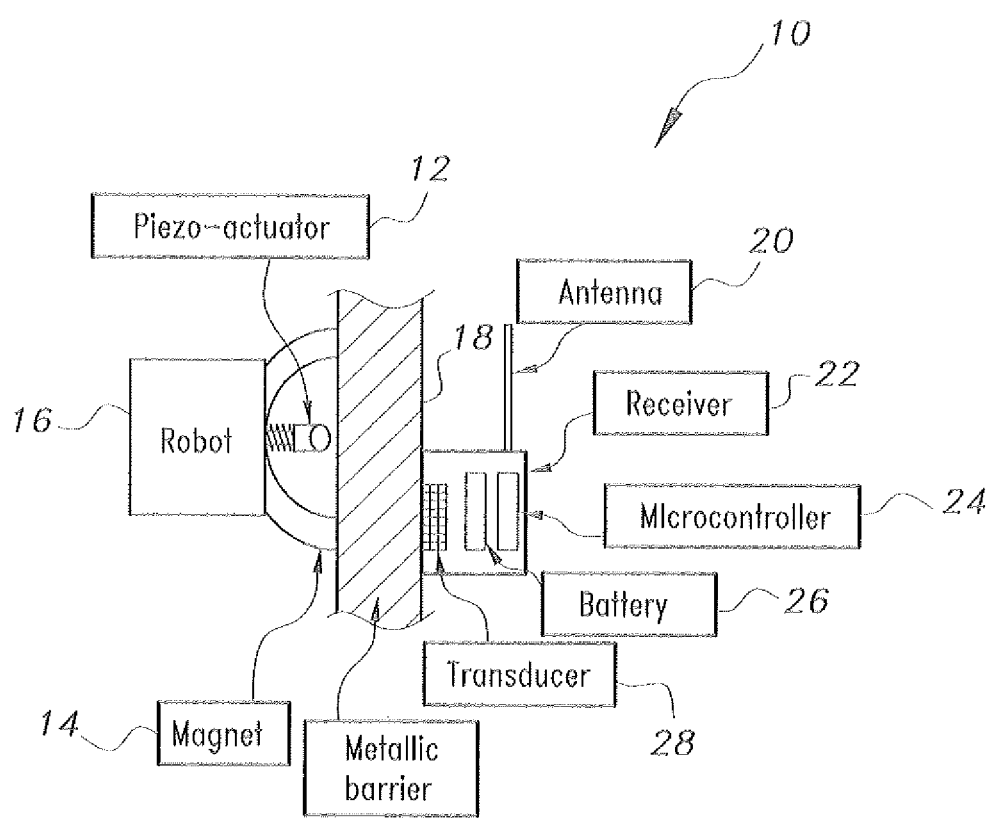
FIG. 1 is a block diagram showing elements of a through metal communication system according to the present invention.

As shown in FIG. 1, the through metal communication system 10 includes a robotic element 16 that attaches itself via a magnetic arm 14 to a metal barrier 18, wall, pipe, or the like. A piezoelectric tapping device 12 is attached to the robotic clement 16 and can tap an encoded message onto the metal 18. The robot 16 preferably includes a piezoelectric actuator 12, a microcontroller 24 to convert text/information to a modified Morse code, and a power source, such as a battery 26, which powers the receiver 22, can also power the actuator 12. The robotic part 16 is in fact a. service robot inside a pipeline for example to clean it or to repair any damage inside. Hence when it needs to communicate any information to the outside world, it will then lock to the wall via 16 and start tapping as indicated.

Figure 3:
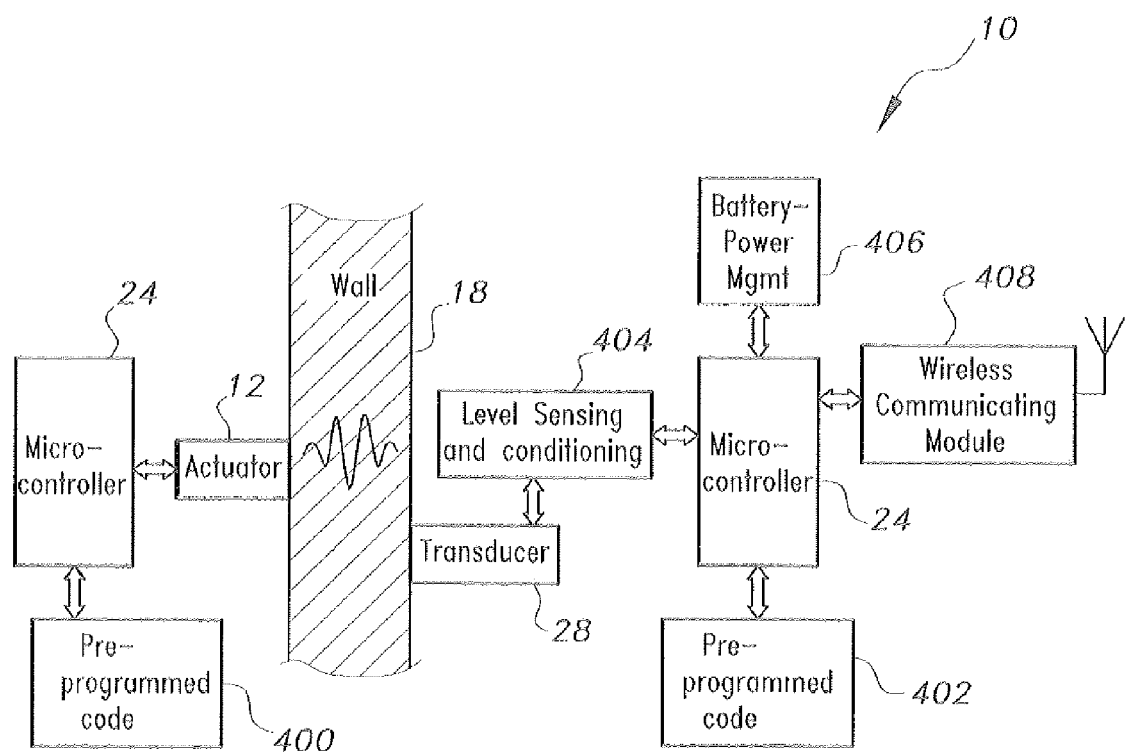
FIG. 3 is a block diagram of an exemplary system architecture of a through metal communication system according to the present invention.

Via acoustical conduction through the metal 18, the encoded message is transmitted to a remote portion of the metal barrier 18. An acoustical receiver 22 is attached to the barrier 18 at the remote site (by any suitable attachment means, e.g., magnets, screws, etc.), where a transducer 28 relays the acoustic information to a level sensing and conditioning module 404 (shown in FIG. 3) that conditions the acoustic signal and forwards it to be processed by a microcontroller 24 to retrieve the encoded message. The message could he displayed on a display device 130 (shown in FIG. 4). The antenna 20 is part of a wireless communication module 408 that could further relay the message to additional receive destinations. Energy conservation of the battery 26 can be managed by a battery power manager 406. The microcontroller 24 on the receiver side runs receiver (RX) pre-programmed code 402. The microcontroller 24 on the transmitter side runs transmitter (TX) pre-programmed code 400.

The system 10 allows communication from inside pipelines made of metal, as it is the practice in the oil and gas industry, to the outside world and vice versa. The principle of the transmission is initiated when the internal moving robot 16, which may be used for various purposes (e.g., cleaning, inspection, etc.) expresses a desire to send data to the outside world to inform about anything happening inside the pipeline or the vessel.

To start the communication, the robot has a control program that causes it to move to and to stick to the wall using the magnetic arm gripper 14, for example. The exemplary actuator 12 is piezoelectric, but may, however, be electromagnetic. In either case, the actuator 12 driven by the microcontroller 24 to tap on the wall 18 to send a characterised or coded signal, such as a modified Morse code or Tap Code.

Figure 2:
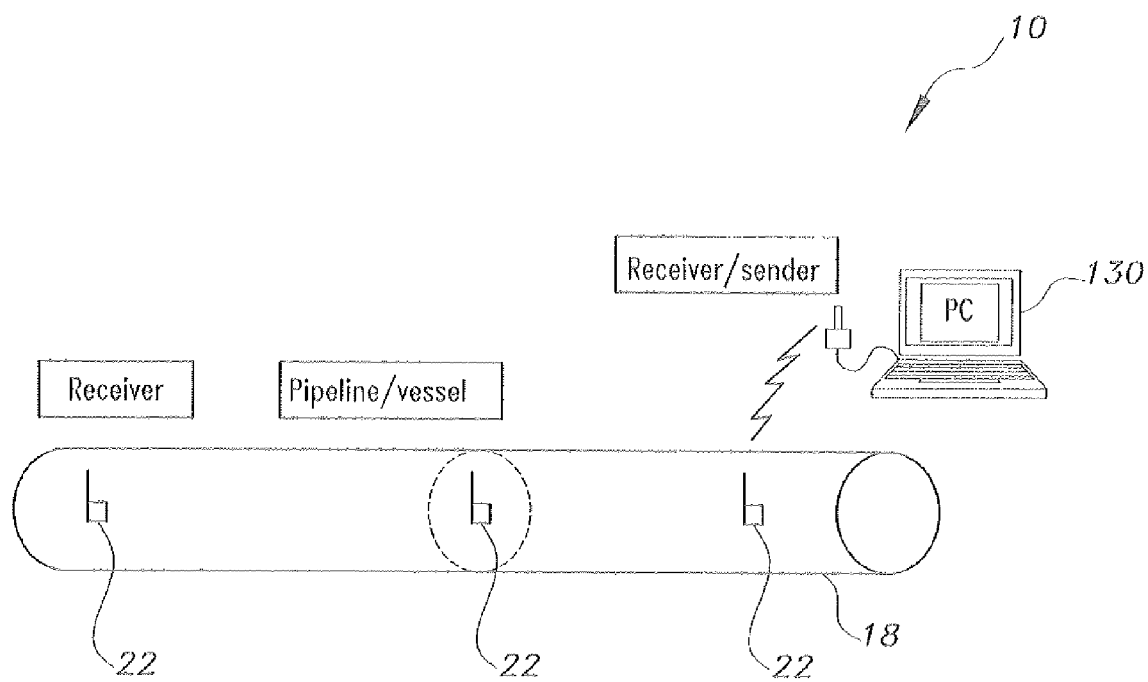
FIG. 2 is a block diagram showing possible receiver locations in a through metal communication system according to the present invention.
Figure 4:
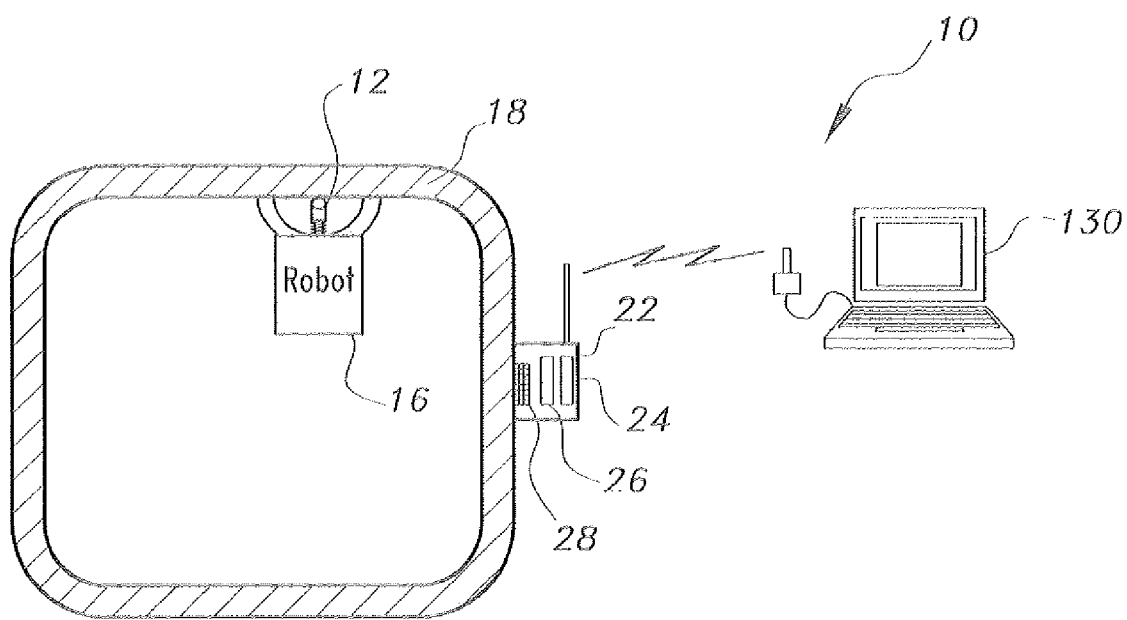
FIG. 4 is a block diagram showing a through metal communication system according to the present invention that uses wireless data communication to extend the range of the system, Similar reference characters denote corresponding features consistently throughout the attached drawings.

Morse code is composed of two elements, a short element commonly referred to as a dot, and a long element commonly referred to as a dash. The short clement will be converted into one knock by the actuator 12, and the long element will be converted into two consecutive knocks by the actuator 12. As shown in FIG. 2, receivers 22 are placed outside the pipe 18 within distances estimated to be minimum to receive an understandable signal, e.g., text. Morse code is an example of communication, It is preferable to add Morse code and the like, or any other coding. Prior to this action, the text to be transmitted is converted into a modified Morse code or Tap code with the aid of a TX/RX microcontroller 24 in TX mode. The microcontroller 24 in transmitter or TX mode generates a command file that specifies the tap timing for the piezoelectric actuator 12. As shown in FIG. 4, the system 10 can also be used where the barrier 18 is a large metallic vessel.

In summary, the sequence of communication entails the Robot collecting information, deciding to transmit data regarding the information, and attaching itself to a metal barrier in order to carry out its decision to transmit. It then translates the information into a code, e.g., a modified Morse code, by converting the code elements to knocks (actuator pulses), which are transmitted by activating a piezoelectric actuator accordingly. A remote transducer receives the data, and using a processor, the received data is translated back to text. The text is stored or sent to another remote receiver. For two-way communication, the device can be configured as a transceiver.

As shown in FIG. 4, an acoustic transducer 28 can be placed on the outside of the pipeline, vessel, or wall 18 remote from the robot 16 transmitter, the transducer 28 picking up the acoustic vibrations conducted by the metallic wall or pipeline and converting the received vibrations into an electronic signal that is encoded into the modified Morse code, Tap Code, or other code by the microcontroller, the encoded signal then being transmitted by wireless (using a wireless modem or other device for the wireless transmission of data), that can be received by a second wireless modem connected to a computer or other device, which may have a display that can represent the message in alphanumeric characters after decoding by the computer processor.

It is to be understood that the present invention is not limited to the embodiments described above, but encompasses any and all embodiments within the scope of the following claims.

I claim:

1. A through metal communication system, comprising:
a host robot configured for generating a text message;
a transmit microcontroller mounted on the robot;
a metal surface gripping member connected to the host robot and in operable communication with the host robot;
a text to tapping code converter connected to the transmit microcontroller and configured to convert the text message to the tapping code, the transmit microcontroller being configured for formulating tapping instructions according to tapping code output from the text to tapping code converter; and
an actuator disposed on the host robot, the actuator being positioned to strike a metal surface when the metal surface gripping member is gripping the metal surface, the actuator being driven by the transmit microcontroller according to the tapping instructions from the transmit microcontroller; and
wherein, when the metal surface gripping member is gripping the metal surface, the actuator taps out a code by striking the metal surface, thereby generating acoustic signals conducted by the metal surface, the code being determined by the tapping instructions from the transmit microcontroller.

2. The through metal communication system according to claim 1, wherein said tapping code is a predefined code uniquely specifying characters of the text message.

3. The through metal communication system according to claim 2, wherein said tapping code is Morse code.

4. The through metal communication system according to claim 2, wherein said tapping code is a modified Morse code in which a Morse code dot translates to one tap from said actuator and a Morse code dash translates to two taps from said actuator.

5. The through metal communication system according to claim 1, wherein said host robot comprises a service robot for maintenance and repair of pipelines, said metal surface gripping member being adapted for attaching an interior surface of a metal pipeline when the robot is servicing the pipeline.

6. A through metal communication system, comprising:
a transducer positioned to sense acoustic signals resulting from tapping on a metal surface;
a signal conditioner connected to the transducer, the signal conditioner conditioning the acoustic signals and sensing levels thereof;
a receive microcontroller connected to the signal conditioner and processing output from the signal conditioner, the receive microcontroller having tapping code processing circuitry for decoding the tapping acoustic signals into text upon recognition of the tapping acoustic signals as being the tapping code; and
a display device connected to the receive microcontroller configured for display the decoded acoustic signals as text.

7. The through metal communication system according to claim 6, further comprising power management circuitry connected to said receive microcontroller for conserving energy from a power source providing power to the through metal communication system.

8. The through metal communication system according to claim 6, further comprising a wireless communication module relaying the text wirelessly to points remote from said transducer.

9. The through metal communication system according to claim 6, wherein said tapping code is Morse code.

10. The through metal communication system according to claim 6, wherein said tapping code is a modified Morse code in which a Morse code dot translates to one acoustic tap and a Morse code dash translates to two acoustic taps.

11. A through metal communication system, comprising:
a transmitting module having:
means for attaching the transmitting module to a metal structure;
means for generating a text message;
means for encoding the text message into an encoded message consisting of a sequence of taps; and
means for tapping the encoded message on the metal structure to generate an acoustic signal;
a receiving module having:
means for attaching the receiving module to the metal structure;
a transducer configured to convert the acoustic signal to an electronic signal carrying the encoded message; and
means for decoding the electronic signal carrying the encoded message to recover the text message.

12. The through metal communication system according to claim 11, further comprising:
a user interface; and
means for outputting the text message to the user interface.

13. The through metal communication system according to claim 11, wherein said means for tapping comprises a piezoelectric actuator.

14. The through metal communication system according to claim 11, wherein said sequence of taps represents text characters as Morse code symbols with a single tap corresponding to a Morse code dot and a pair of taps corresponding to a Morse code dash.

* * * * *